(12) United States Patent
Saurabh et al.

(10) Patent No.: US 11,499,985 B2
(45) Date of Patent: Nov. 15, 2022

(54) LOW LATENCY VARIABLE ROTATIONAL FREQUENCY MEASUREMENTS

(71) Applicant: Schneider Electric Systems USA, Inc., Foxborough, MA (US)

(72) Inventors: Anupam Saurabh, Hyderabad (IN); Ajay Mishra, Lake Forest, CA (US); Shahid Ansari, Hyderabad (IN)

(73) Assignee: Schneider Electric Systems USA, Inc., Foxborough, MA (US)

( * ) Notice: Subject to any disclaimer, the term of this patent is extended or adjusted under 35 U.S.C. 154(b) by 66 days.

(21) Appl. No.: 17/121,094

(22) Filed: Dec. 14, 2020

(65) Prior Publication Data

US 2021/0199684 A1    Jul. 1, 2021

Related U.S. Application Data

(60) Provisional application No. 62/956,123, filed on Dec. 31, 2019.

(51) Int. Cl.
*G01P 3/44*    (2006.01)

(52) U.S. Cl.
CPC ..................... *G01P 3/44* (2013.01)

(58) Field of Classification Search
CPC ............... G01P 3/44; G01P 3/489; G01P 3/00
See application file for complete search history.

(56) References Cited

U.S. PATENT DOCUMENTS

| 4,409,664 A | 10/1983 | Skarvada |
| 5,231,597 A | 7/1993 | Komatsu |
| 2007/0043528 A1 | 2/2007 | Bae |
| 2008/0110283 A1 | 5/2008 | Shaver et al. |
| 2010/0171457 A1* | 7/2010 | Letor ............ G01P 3/48 318/490 |
| 2015/0241460 A1 | 8/2015 | Jacoby et al. |

FOREIGN PATENT DOCUMENTS

| DE | 102011078041 A1 | 12/2012 |
| EP | 0270313 B1 | 1/1994 |
| EP | 2177917 A1 | 11/2013 |
| WO | 20190217635 A1 | 11/2019 |

OTHER PUBLICATIONS

European Search Report for Application No. EP20213671.9, dated May 6, 2021, 14 pages.

* cited by examiner

*Primary Examiner* — Manuel A Rivera Vargas
(74) *Attorney, Agent, or Firm* — Locke Lord LLP (57) ABSTRACT

Systems and methods for measuring rotational frequency in rotating machines use variable sliding windows of measurement. The systems and methods count and store the number of internal clock cycles between the start of a measurement interval and each pulse signal from a pulse generator. Rotational frequency is determined by taking a difference between the count for a most recent pulse signal and the count for some previous pulse signal within the measurement interval. The number of pulse signals that have occurred between the most-recent pulse signal and the previous pulse signal represents a window of measurement. This window of measurement, or the size thereof, may then be used along with the count difference to determine the rotational frequency. The window of measurement may then be slid to the counts for next most recent pulse signal and the next previous pulse signal to obtain a new count difference, and so on.

20 Claims, 5 Drawing Sheets

LOW LATENCY VARIABLE ROTATIONAL FREQUENCY MEASUREMENTS

CROSS-REFERENCE TO RELATED APPLICATIONS

This application for patent claims the benefit of priority to and incorporates herein by reference U.S. Provisional Application No. 62/956,123, entitled "Low Latency Variable Rotational Frequency Measurements," filed Dec. 31, 2019.

TECHNICAL FIELD

The present disclosure relates to systems and methods for measuring rotational frequency in motors, turbines, and similar rotating machines, and particularly to systems and methods for providing variable frequency measurements and parallel variable frequency measurements to improve measurement response times with high accuracy and low latency in measuring the rotational frequency of such rotating machines.

BACKGROUND

Rotating machines like motors, turbines, and the like, require fast and accurate measurements of rotational frequency for proper control and operation and to prevent overspeed conditions that may damage the machines and/or endanger personnel. The term "rotational frequency" as used herein refers to the number of times a gear or similar object revolves around an axis over a given unit of time and is usually measured in revolutions per minute (rpm). In a typical arrangement, a sensor is mounted in close proximity to the gear of the rotating machine. As the machine operates and the gear rotates, the sensor generates a pulse signal for each gear tooth that passes a point on or near the sensor. Various types of sensors may be used for this purpose, including mechanical sensors, magnetic sensors, optical sensors, and the like. Each pulse signal triggers a counter that captures an amount of elapsed time since the previous pulse signal, typically by counting the number of internal clock cycles since the previous pulse signal. A controller uses the elapsed time (number of clock cycles) between pulse signals to determine the rotational frequency of the gear.

However, while a number of advances have been made in techniques for measuring rotational frequency, it will be readily appreciated that improvements are continually needed.

SUMMARY

Embodiments of present disclosure provide systems and methods for measuring rotational frequency in rotating machines using variable sliding windows of measurement. The systems and methods store the time that has elapsed since the start of a measurement interval and each pulse signal from a pulse generator. The elapsed times are captured and stored as a count of the number of internal clock cycles that have passed since the start of the measurement interval and each pulse signal. Each count is stored separately and sequentially for a given measurement interval, such that a new measurement interval resets the count and begins a new sequence of stored counts. Rotational frequency is determined by taking a difference between the count for a most-recent pulse signal and the count for some predefined previous pulse signal within the measurement interval. The number of pulse signals that have occurred between the most-recent pulse signal and the previous pulse signal represents a window of measurement. This window of measurement, or rather the size thereof, may then be used along with the count difference to determine the rotational frequency within the measurement interval. The window of measurement may then be slid to the counts for next most-recent pulse signal and the next previous pulse signal to obtain a new count difference, and so on. In this way, changes in rotational frequency can be quickly captured on an ongoing basis, as any change would manifest as an increase or decrease in the count difference when the window of measurement slides to the count for the next pulse signal. The foregoing arrangement also allows for very low latency, as new/updated rotational frequency measurements are determined using already existing, previously captured counts.

In some embodiments, the size of the sliding window may be dynamically varied from measurement to measurement within a given measurement interval, or from measurement interval to measurement interval, as needed for a particular application.

In some embodiments, multiple sliding windows may be used in parallel to obtain multiple count differences and rotational frequency measurements concurrently. The sliding windows may partially overlap one another in some cases, or they may remain separate in some cases. A mathematical function, such as an averaging function, may then be applied to the rotational frequency measurements to produce a resultant rotational frequency measurement.

In some embodiments, the pulse signals from the pulse generator may be divided using a frequency divider. The frequency divider may produce a divided down signal in which a single pulse of the divided down signal reflects or corresponds to several pulses of the original pulse signals over a given measurement interval, depending on the size of the divider. Such an arrangement reduces implementation complexity by avoiding the need to sample each individual pulse in the original pulse signals over the measurement interval.

In general, in one aspect, embodiments of the present disclosure related to a rotational frequency measurement circuit. The rotational frequency measurement circuit comprises, among other things, a counter configured to count clock cycles of a clock signal during a measurement interval, the counter operable to output a count value upon receipt of a pulse, the pulse corresponding to at least one of several protrusions on a rotary component of a rotating machine, the count value representing the number of clock cycles that have passed since a start of the measurement interval. The rotational frequency measurement circuit also comprises a memory coupled to the counter and configured to receive a plurality of count values from the counter during the measurement interval, the memory operable to store each count value separately and sequentially during the measurement interval. The rotational frequency measurement circuit further comprises a frequency processor coupled to the memory, the frequency processor operable to determine a rotational frequency of the rotary component using a difference between a most recent count value and a selected previous count value and a window of measurement, the window of measurement representing the number of pulses that have occurred between the most-recent count value and the previous count value during the measurement interval.

In general, in another aspect, embodiments of the present disclosure related to a method of measuring rotational frequency. The method comprises, among other things, receiving, at a counter, a pulse during a measurement interval, the counter configured to count clock cycles of a clock signal during the measurement interval, the pulse corresponding to at least one of several protrusions on a rotary component of a rotating machine. The method also comprises outputting, at the counter, a count value upon receipt of the pulse, the count value representing the number of clock cycles that have passed since a start of the measurement interval, and receiving, at a memory coupled to the counter, a plurality of count values from the counter during the measurement interval. The method further comprises storing, at the memory, each count value received from the counter separately and sequentially during the measurement interval, and determining, at a frequency processor coupled to the memory, a rotational frequency of the rotary component using a difference between a most recent count value and a selected previous count value and a window of measurement, the window of measurement representing the number of pulses that have occurred between the most-recent count value and the previous count value during the measurement interval.

In accordance with any one or more of the foregoing embodiments, the counter is configured to reset at the start of a new measurement interval, the memory is a circular buffer configured to begin a new sequence of stored counter values at the start of a new measurement interval.

In accordance with any one or more of the foregoing embodiments, the frequency processor is further operable to slide the window of measurement to a next most-recent count value and a next previous count value in the memory, and determine the rotational frequency of the rotary component using a difference between the next most recent count value and the next previous count value and the window of measurement, and/or the frequency processor is further operable to vary a size of the window of measurement during the measurement interval in response to a change in a rotating speed of the rotary component.

In accordance with any one or more of the foregoing embodiments, the rotational frequency is a first rotational frequency and the frequency processor is further operable to determine a second rotational frequency of the rotary component concurrently with determining the first rotational frequency, the frequency processor determining the second rotational frequency using a second difference between a second most recent count value and a second previous count value and a second window of measurement, and optionally, the frequency processor is further operable to use the first rotational frequency and the second rotational frequency to produce a resultant rotational frequency.

In accordance with any one or more of the foregoing embodiments, the frequency processor is further operable to compute an optimum size for the window of measurement using one or more of minimum rotational frequency, maximum rotational frequency, measurement interval, and error percentage for the rotary component. In accordance with any one or more of the foregoing embodiments, a variable divider is configured to provide the pulse to the counter, the pulse provided by the variable divider corresponding to several protrusions on the rotary component, and optionally, the frequency processor is further operable to compute an optimum division value for the variable divider using one or more of minimum rotational frequency, maximum rotational frequency, measurement interval, and error percentage for the rotary component.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
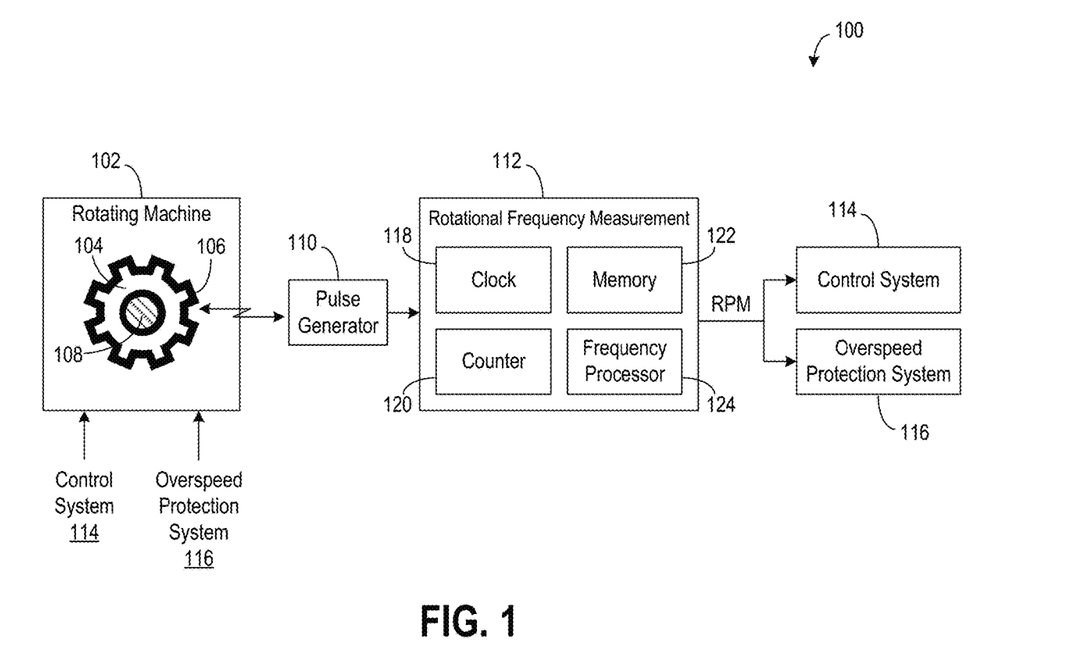
FIG. 1 is a schematic diagram illustrating an exemplary system for measuring rotational frequency of a rotating machine according to embodiments of this disclosure.

Referring now to FIG. 1, a schematic diagram of an exemplary system 100 is shown for measuring rotational frequency in a rotating machine 102 according to embodiments of the present disclosure. The rotating machine 102 in this example may be any type of machine that uses a rotary component, such as a gear 104, having a known number of protrusions thereon, such as gear teeth 106, and that rotates around a shaft 108 or other axis during operation of the rotating machine 102. Such rotating machines 102 may include various turbines (e.g., steam turbines, gas turbines, hydro turbines, and wind turbines), internal combustion engines, electric motors, generators, compressors, and other machines that use or have a rotary component. A pulse generator 110 is mounted in close proximity to the gear 104 for detecting the gear teeth 106. The pulse generator 110 may be a mechanical, magnetic, optical, or any suitable rotary sensor capable of generating a pulse signal corresponding to each gear tooth 106. A rotational frequency measurement circuit 112 receives and processes the pulse signals from the pulse generator 110 to determine a rotational frequency of the gear 104. The rotational frequency, typically provided in revolutions per minute (rpm), may then be used by various systems, such as a control system 114 and/or an overspeed protection system 116, to control operation of the rotating machine 102.

In the FIG. 1 example, the rotational frequency measurement circuit 112 processes the pulse signals and determines the rotational frequency using several components. These components are shown here as functional blocks and include a clock 118, a counter 120, a memory 122, and a frequency processor 124, among other components. In general, the clock 118 provides an internal clock signal that serves as an internal time base, while the counter 120 operates to count the clock cycles of the clock signal. The memory 122 stores the counts from the counter 120, and the frequency processor 124 uses the stored counts to determine a rotational frequency for the gear 104. Preferably, the rotational frequency measurement circuit 112 (or one or more components thereof) is implemented using programmable logic, such as a microprocessor, programmable logic controller (PLC), field-programmable gate array (FPGA), and the like.

Figure 2:
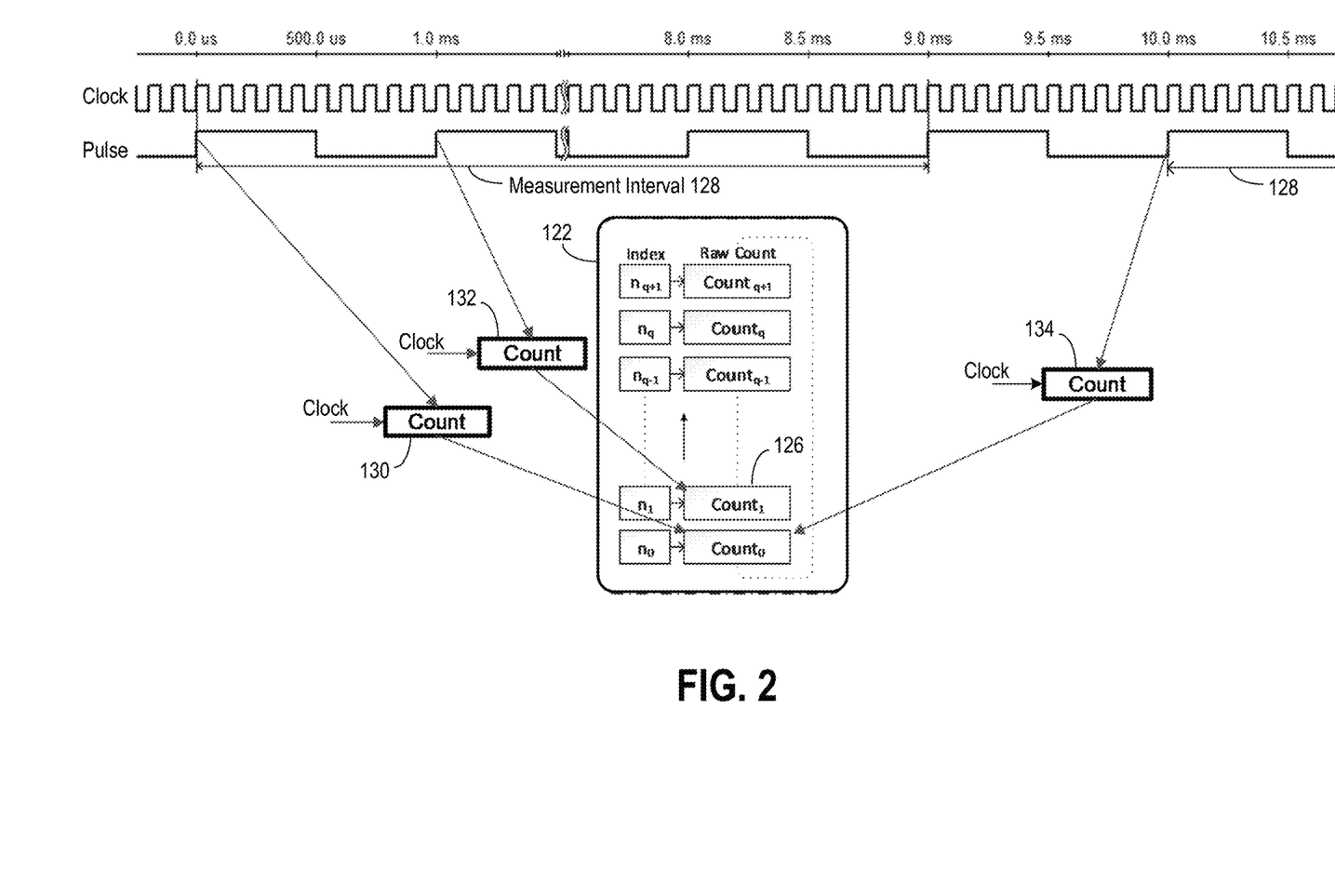
FIG. 2 is a timing diagram illustrating an exemplary method of measurements rotational frequency according to embodiments of this disclosure.

FIG. 2 is a timing diagram showing operation of some of the above components according to embodiments of this disclosure. In this example, Clock is the internal clock signal provided by the clock 118, Pulse is the pulse input signals provided by the pulse generator 110, and Measurement Interval is a preselected time interval 128 during which the clock cycles are counted for determining rotational frequency. The memory 122 resembles a circular buffer or queue having a series of data registers 126 that are filled sequentially and can be wrapped around to the first data register when the filling process needs to restart. Each data register is labeled $n_q$ for reference, where 'q' designates a register index number (i.e., q=0 is the first data register, q=1 is the second data register, etc.).

In operation, the rising edge of the first pulse input signal within the measurement interval 128 starts/resets the counter 120 to begin counting the clock cycles of the internal clock signal. That first rising edge (and each subsequent rising edge) also prompts the counter 120 to output the current raw counter value 130 to the memory 122, which captures that counter value 130 in the first data register, $n_0$, as $Count_0$. The rising edge of the second pulse input signal prompts the counter 120 to output the next counter value 132 to the memory 122, which captures that next counter value 132 in the next data register, $n_1$, as $Count_1$, and so on. This process continues until the end of the measurement interval 128 is reached, after which the counter 120 resets and the memory 122 wraps back around to the first data register, $n_0$, to store a new current counter value 134 in a new measurement interval 128. The memory 122 therefore needs to have a sufficient number of data registers 126 to hold each captured counter value in a separate data register for a given length measurement interval 128.

FIGS. 3A-3D are functional diagram showing operation of the rotational frequency measurement circuit 112, and particularly the frequency processor 124, according to embodiments of this disclosure. In these examples, the gear 104 is assumed to have 60 teeth, which results in the pulse generator 110 producing 60 pulses per revolution.

Figure 3A:
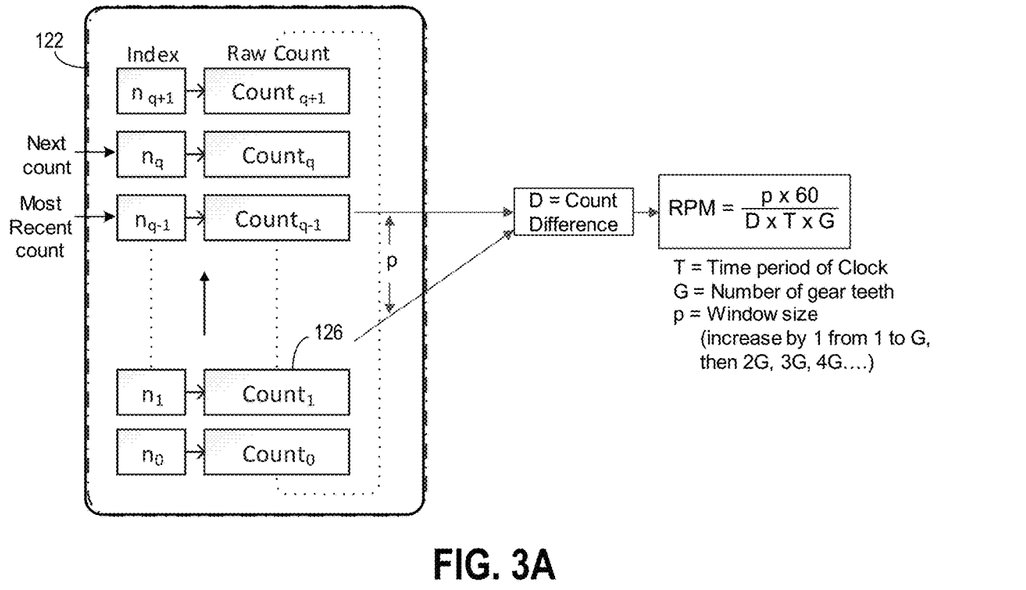
FIGS. 3A-3D are functional diagrams illustrating exemplary rotational frequency measurements according to embodiments of this disclosure.

Referring first to FIG. 3A, in some embodiments, the frequency processor 124 determines rotational frequency by taking a count difference D between a most-recent counter value, assume for example $Count_3$ (i.e., q=4), and some selected previous counter value, say $Count_1$ (i.e., q=2). The frequency processor 124 then uses this count difference D in the following equation to determine the rotational frequency of the gear 104:

$$RPM = \frac{p \times 60}{D \times T \times G} \quad (1)$$

In Equation (1) above, 60 is a time conversion factor (i.e., 60 sec/min), T is the time period of the clock signal, G is the number of pulses per revolution produced by the gear teeth, and p is a window of measurement that reflects the difference in the number of pulse input signals between the two counter values making up D (i.e., $Count_3$ and $Count_1$). In this example, the window of measurement p has a value of 2 pulses (i.e., 3−1=2) and G has a value of 60 pulses/revolution. If it can be assumed from FIG. 2 that each clock cycle is 100 μsec and there are 10 clock cycles in each pulse input signal, then the time period T for the clock signal is 0.0001 sec/cycle and D has a value of 20 cycles (i.e., 30−10=20).

The result is an RPM of about 1,000 rpm (i.e., (2 pulses×60 sec/min)/(20 cycles×0.0001 sec/cycle×60 pulses/revolution)).

Figure 3B:
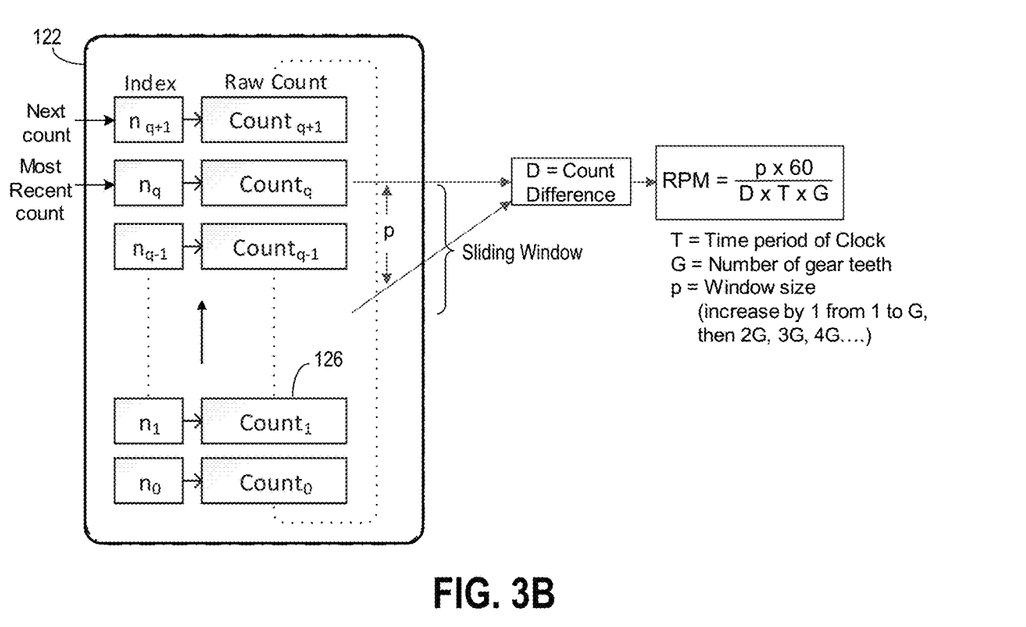

FIG. 3B shows the rotational frequency measurement circuit 112 sliding the window of measurement p to the next data register. This allows the rotational frequency measurement circuit 112 to obtain a new count difference D between a new most-recent counter value, now $Count_4$, and a new previous counter value, now $Count_2$, and so on. In this way, the rotational frequency measurement circuit 112 can quickly capture changes in the rotational frequency of the gear 104 on an ongoing basis, as any change would manifest as an increase or decrease in the value of the count difference D when the window of measurement p slides to the next data register. The foregoing arrangement also allows the rotational frequency measurement circuit 112 to experience very low latency, as new/updated rotational frequency measurements are determined using already existing, previously captured counter values. The low latency is particularly important for certain applications that require extremely fast measurement response times, such as overspeed detection systems (ODS) and similar applications.

Figure 3C:
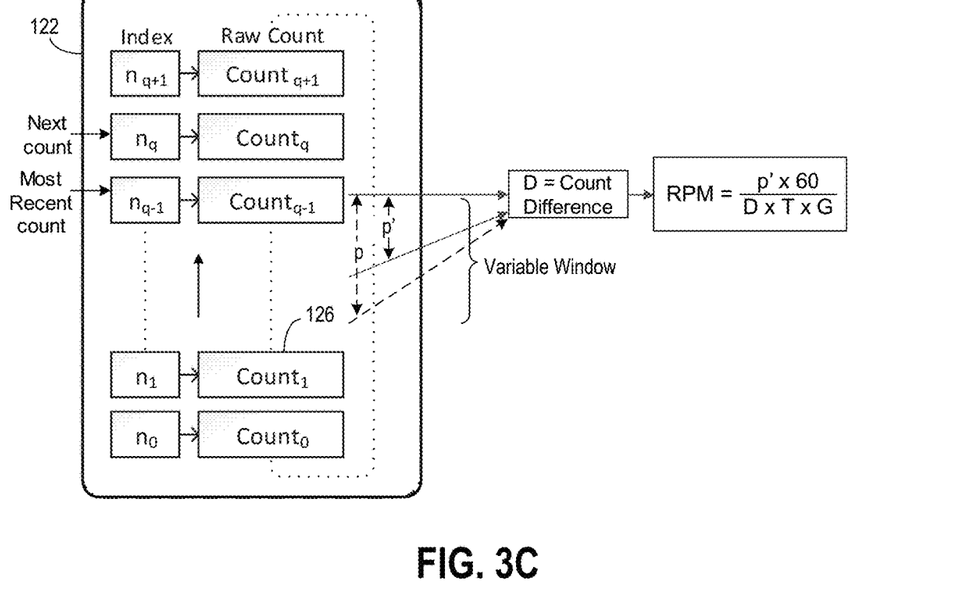

In addition, as shown in FIG. 3C, the rotational frequency measurement circuit 112 can dynamically vary the size of the sliding window of measurement p from measurement to measurement on an as-needed basis, depending on the particular application. For example, as the rotational frequency of the gear 104 changes, the sliding window p (e.g., 2 pulses) can be increased or decreased to p' (e.g., 1 pulse, 3 pulses, etc.). Such a variable sliding window can better maintain accuracy where the rpm rate of change is changing, for example, where the gear 104 is spinning up and the rpm is detected to be accelerating. In that case, the sliding window may be dynamically decreased in order to reduce response time. Conversely, where the gear 104 is slowing down and the rpm is detected to be decelerating, the sliding window may be dynamically increased in order to increase accuracy. In some embodiments, the sliding window p can be multiples of G (e.g., 2G, 3G, 4G, etc.) where a sliding window extending beyond one gear revolution is desired (e.g., p=60, 120, 180, 240, etc.).

Figure 3D:
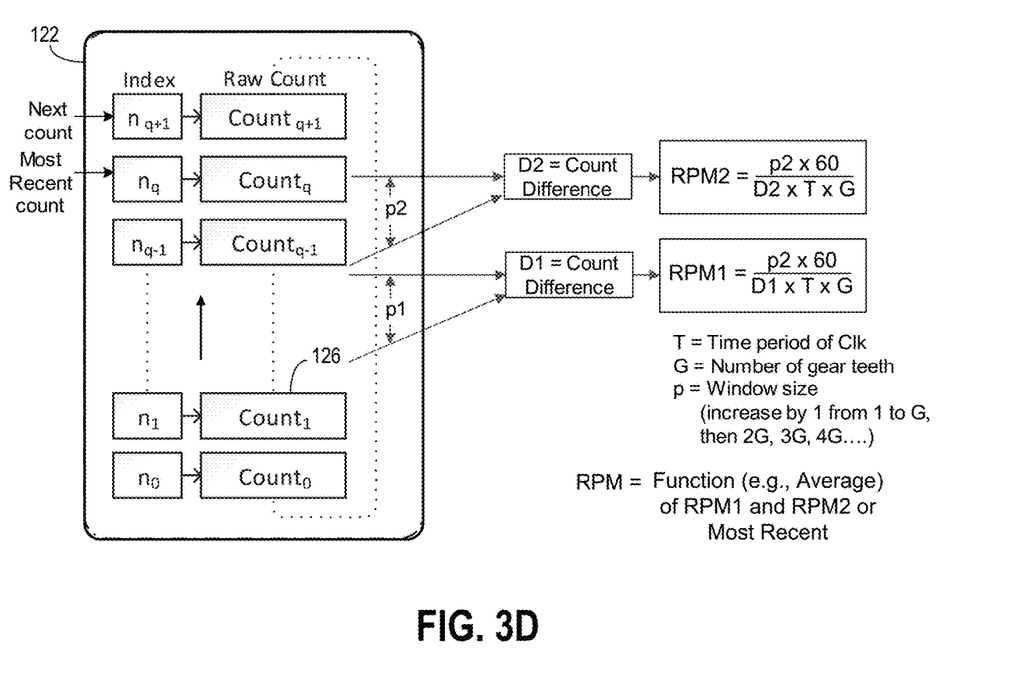

Moreover, as shown in FIG. 3D, the rotational frequency measurement circuit 112 can perform multiple rotational frequency measurements in parallel using multiple sliding windows of measurement. For example, the rotational frequency measurement circuit 112 can use a first window of measurement p1 to obtain a first count difference D1 and rotational frequency measurement RPM1, while concurrently using a second window of measurement p2 to obtain a second count difference D2 and rotational frequency measurement RPM2. The two sliding windows of measurement may partially overlap one another in some embodiments, or they may remain separated in some embodiments. These parallel measurements may be performed using a sufficiently large circular buffer (e.g., FPGA) as the memory 122 in order to accommodate the additional counts, particularly if the sliding windows do not overlap. The rotational frequency measurement circuit 112 may then apply a mathematical function to the two rotational frequency measurements RPM1 and RPM2, such as an averaging function, to produce a resultant rotational frequency measurement (i.e., RPM=(RPM1+RPM2)/2). Alternatively, the rotational frequency measurement circuit 112 may simply select the latest in time of the two measurements for use as the rotational frequency measurement.

In the foregoing embodiments, a window size algorithm or model may be developed to dynamically predict an optimum sliding window size p to be used for a given measurement. The model, which may be in the form of an equation in some embodiments, may be developed using statistical and numerical techniques known to those skilled in the art, including by application of machine learning to rotational frequency measurement data collected over time. Such a model may be configured based at least in part on a desired minimum and maximum rotational frequencies for a given rotating machine application, a desired measurement interval for the application, and/or a maximum error percentage for the application, among other configuration parameters. The model may then be incorporated into a rotational frequency measurement circuit and used to dynamically compute an optimum sliding window size that should be used for a given rotational frequency measurement. This allows the rotational frequency measurement circuit to adapt the size of the sliding window for high accuracy consistently across a desired rotational frequency range, even within the same measurement interval. In this way, the rotational frequency measurement circuit may begin restoring high accuracy as quickly as the next rotational frequency measurement when the rotational frequency of the application changes.

Figure 4:
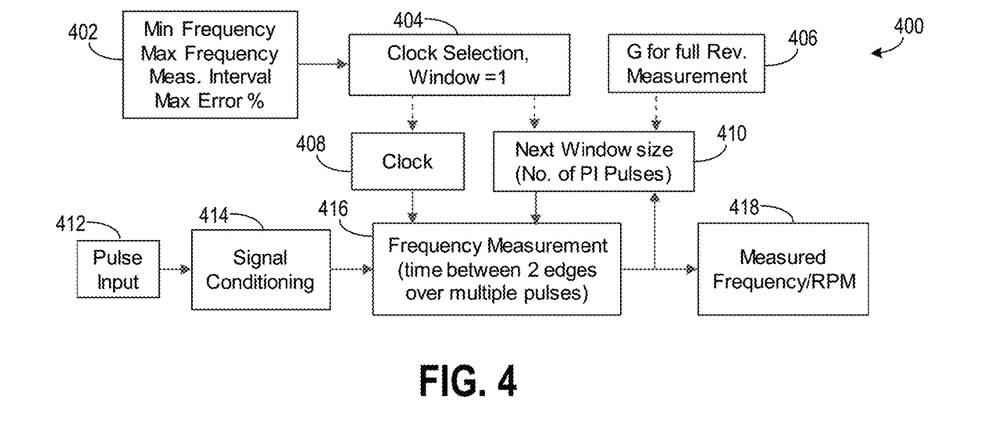
FIG. 4 is a functional diagram illustrating an exemplary method for measuring rotational frequency according to embodiments of this disclosure.

FIG. 4 is a functional diagram illustrating an exemplary method 400 that may be used with a rotational frequency measurement circuit to measure rotational frequency by using a dynamically-computed model-based sliding window of measurement. The method 400 generally begins at block 402 where a minimum frequency, maximum frequency, measurement interval, and maximum error percentage are selected for the rotational frequency measurement circuit, if not previously done. At block 404, an appropriate clock frequency is selected for the rotational frequency measurement circuit based on the inputs from block 402, if not previously done, and the size of the sliding window is set to an initial value, for example, p=1. At block 406, the number of gear teeth (i.e., pulses per revolution) is selected, if not previously done.

At block 408, the clock signal frequency is set using the clock frequency selection from block 404, and at block 410, the next window size (i.e., number of pulse input signals) is set for the rotational frequency measurement circuit. Initially, this window size may be the initial window size selected in block 404, but can be subsequently computed using an algorithm or model similar to the one mentioned above. The pulse input signal is provided at block 412. Any signal conditioning that may be needed is provided at block 414. The rotational frequency measurement circuit thereafter determines a rotational frequency as described above (see Equation (1)) at block 416, and outputs the rotational frequency at block 418. The rotational frequency is also provided as feedback to block 410 for the rotational frequency measurement circuit to dynamically compute the next window size using the algorithm or model therein.

Figure 5:
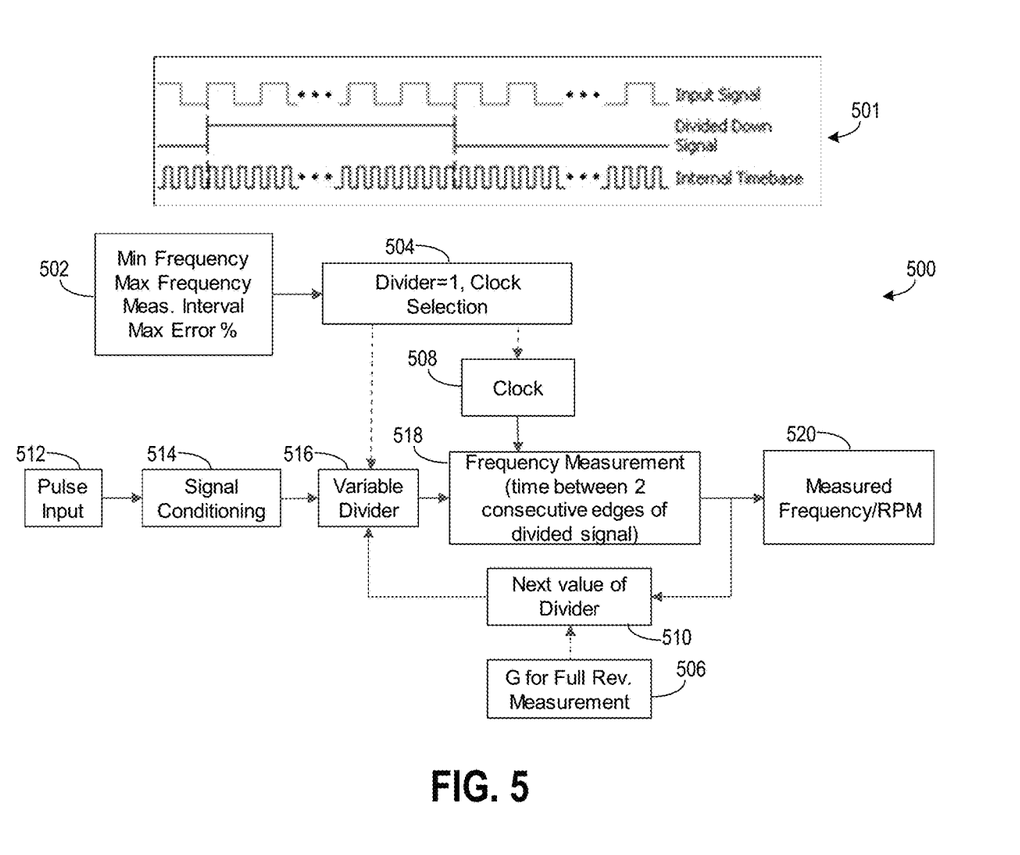
FIG. 5 is a functional diagram illustrating an alternative method for measuring rotational frequency according to embodiments of this disclosure.

FIG. 5 is a functional diagram illustrating an exemplary method 500 that may be used with a rotational frequency measurement circuit to measure rotational frequency by using a frequency divider to divide the frequency of the pulse input signal. As graphically depicted at 501, the frequency divider produces a divided down signal in which a single pulse of the divided down signal reflects or corresponds to several pulses of the original pulse input signal over a given measurement interval, depending on the size of the divider. Such an arrangement reduces implementation complexity by avoiding the need to sample each individual pulse in the original pulse input signal over the measurement interval.

The method 500 generally begins at block 502 where, as before, a minimum frequency, maximum frequency, measurement interval, and maximum error percentage are selected for the rotational frequency measurement circuit, if not previously done. At block 504, an appropriate clock frequency is selected for the rotational frequency measurement circuit based on the inputs from block 502, if not previously done, and the size of the divider is set to an initial value, for example, Divider=1. At block 506, the number of gear teeth (i.e., pulse per revolution) is selected, if not previously done.

At block 508, the clock signal frequency is set using the clock frequency selection from block 504, and at block 510, the next divider value is set. Initially, this divider value may be the initial divider value selected in block 504, but can be subsequently computed using an algorithm or model similar to that mentioned above. The pulse input signal is provided at block 512. Any signal conditioning that may be needed is provided at block 514. The conditioned pulse input signal is thereafter divided at block 516 using the divider value from block 510, which is initially 1. The divided down signal is thereafter used by the rotational frequency measurement circuit to determine a rotational frequency at block 516 (e.g., using Equation (1) modified to account for the divided down signal). The rotational frequency measurement circuit then outputs the rotational frequency at block 518 and also provides the rotational frequency as feedback to block 510. At block 510, the rotational frequency measurement circuit dynamically computes the next divider value using the algorithm or model therein.

The above examples provide a number of advantages over existing rotational speed measurement systems and methods. These advantages include a parametric measurement model that can be configured dynamically, driven by frequency range, accuracy, and measurement interval. Further advantages include a sliding variable size window design with low latency measurement on demand. Still further advantages include a method of achieving high accuracy rotational speed measurements consistently within the same measurement interval across a frequency range. Still further advantages include a method of restoring full measurement accuracy in the next measurement interval when rotational frequency changes. In this way, measurement error is controlled and minimized, even in abnormal, extreme conditions. These further advantages include fast parallel measurements at lower frequencies with stable results, which is particularly useful for AC frequency and phase difference measurement and power factor correction in power generation, or for any other application where accurate and fast measurements of rotational speed is needed.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A rotational frequency measurement circuit, comprising:
a counter configured to count clock cycles of a clock signal during a measurement interval, the counter operable to output a count value upon receipt of a pulse, the pulse corresponding to at least one of several protrusions on a rotary component of a rotating machine, the count value representing the number of clock cycles that have passed since a start of the measurement interval;
a memory coupled to the counter and configured to receive a plurality of count values from the counter during the measurement interval, the memory operable to store each count value separately and sequentially during the measurement interval; and
a frequency processor coupled to the memory, the frequency processor operable to determine a rotational frequency of the rotary component using a difference between a most-recent count value and a selected previous count value and a window of measurement, the window of measurement representing the number of pulses that have occurred between the most-recent count value and the previous count value during the measurement interval,
wherein the counter is configured to reset at the start of a new measurement interval.

2. The circuit of claim 1, wherein the rotational frequency is a first rotational frequency and the frequency processor is further operable to determine a second rotational frequency of the rotary component concurrently with determining the first rotational frequency, the frequency processor determining the second rotational frequency using a second difference between a second most-recent count value and a second previous count value and a second window of measurement.

3. The circuit of claim 2, wherein the frequency processor is further operable to use the first rotational frequency and the second rotational frequency to produce a resultant rotational frequency.

4. The circuit of claim 1, further comprising a variable divider configured to provide the pulse to the counter, the pulse provided by the variable divider corresponding to several protrusions on the rotary component.

5. The circuit of claim 4, wherein the frequency processor is further operable to compute an optimum division value for the variable divider using one or more of minimum rotational frequency, maximum rotational frequency, measurement interval, and error percentage for the rotary component.

6. The circuit of claim 1, wherein the memory is a circular buffer configured to begin a new sequence of stored counter values at the start of a new measurement interval.

7. The circuit of claim 1, wherein the frequency processor is further operable to slide the window of measurement to a next most-recent count value and a next previous count value in the memory, and determine the rotational frequency of the rotary component using a difference between the next most-recent count value and the next previous count value and the window of measurement.

8. The circuit of claim 1, wherein the frequency processor is further operable to vary a size of the window of measurement during the measurement interval in response to a change in a rotating speed of the rotary component.

9. The circuit of claim 1, wherein the frequency processor is further operable to compute an optimum size for the window of measurement using one or more of minimum rotational frequency, maximum rotational frequency, measurement interval, and error percentage for the rotary component.

10. A method of measuring rotational frequency, comprising:
receiving, at a counter, a pulse during a measurement interval, the counter configured to count clock cycles of a clock signal during the measurement interval, the pulse corresponding to at least one of several protrusions on a rotary component of a rotating machine;
outputting, at the counter, a count value upon receipt of the pulse, the count value representing the number of clock cycles that have passed since a start of the measurement interval;
receiving, at a memory coupled to the counter, a plurality of count values from the counter during the measurement interval;
storing, at the memory, each count value received from the counter separately and sequentially during the measurement interval;
determining, at a frequency processor coupled to the memory, a rotational frequency of the rotary component using a difference between a most-recent count value and a selected previous count value and a window of measurement, the window of measurement representing the number of pulses that have occurred between the most-recent count value and the previous count value during the measurement interval; and
resetting the counter at the start of a new measurement interval.

11. The method of claim 10, wherein the rotational frequency is a first rotational frequency, further comprising determining, at the frequency processor, a second rotational frequency of the rotary component concurrently with determining the first rotational frequency, the frequency processor determining the second rotational frequency using a second difference between a second most-recent count value and a second previous count value and a second window of measurement.

12. The method of claim 11, further comprising using, at the frequency processor, the first rotational frequency and the second rotational frequency to produce a resultant rotational frequency.

13. The method of claim 10, further comprising providing the pulse to the counter at a variable divider, the pulse provided by the variable divider corresponding to several protrusions on the rotary component.

14. The method of claim 13, further comprising computing, at the frequency processor, an optimum division value for the variable divider using one or more of minimum rotational frequency, maximum rotational frequency, measurement interval, and error percentage for the rotary component.

15. The method of claim 10, wherein the memory is a circular buffer, further comprising storing a new sequence of counter values in the circular buffer at the start of a new measurement interval.

16. The method of claim 10, further comprising sliding, at the frequency processor, the window of measurement to a next most-recent count value and a next previous count value in the memory, and determining, at the frequency processor, the rotational frequency of the rotary component using a difference between the next most-recent count value and the next previous count value and the window of measurement.

17. The method of claim 10, further comprising varying, at the frequency processor, a size of the window of measurement during the measurement interval in response to a change in a rotating speed of the rotary component.

18. The method of claim 10, further comprising computing, at the frequency processor, an optimum size for the window of measurement using one or more of minimum rotational frequency, maximum rotational frequency, measurement interval, and error percentage for the rotary component.

19. A rotational frequency measurement circuit, comprising:
a counter configured to count clock cycles of a clock signal during a measurement interval, the counter operable to output a count value upon receipt of a pulse, the pulse corresponding to at least one of several protrusions on a rotary component of a rotating machine, the count value representing the number of clock cycles that have passed since a start of the measurement interval;
a memory coupled to the counter and configured to receive a plurality of count values from the counter during the measurement interval, the memory operable to store each count value separately and sequentially during the measurement interval; and
a frequency processor coupled to the memory, the frequency processor operable to determine a rotational frequency of the rotary component using a difference between a most-recent count value and a selected previous count value and a window of measurement, the window of measurement representing the number of pulses that have occurred between the most-recent count value and the previous count value during the measurement interval,
wherein the memory is a circular buffer configured to begin a new sequence of stored counter values at the start of a new measurement interval.

20. A method of measuring rotational frequency, comprising:
receiving, at a counter, a pulse during a measurement interval, the counter configured to count clock cycles of a clock signal during the measurement interval, the pulse corresponding to at least one of several protrusions on a rotary component of a rotating machine;
outputting, at the counter, a count value upon receipt of the pulse, the count value representing the number of clock cycles that have passed since a start of the measurement interval;
receiving, at a memory coupled to the counter, a plurality of count values from the counter during the measurement interval;
storing, at the memory, each count value received from the counter separately and sequentially during the measurement interval; and determining, at a frequency processor coupled to the memory, a rotational frequency of the rotary component using a difference between a most-recent count value and a selected previous count value and a window of measurement, the window of measurement representing the number of pulses that have occurred between the most-recent count value and the previous count value during the measurement interval, wherein the memory is a circular buffer, further comprising storing a new sequence of counter values in the circular buffer at the start of a new measurement interval.

\* \* \* \* \*